United States Patent
Sasaki et al.

(10) Patent No.: US 6,554,194 B1
(45) Date of Patent: Apr. 29, 2003

(54) IC CARD AND ITS MANUFACTURING METHOD

(75) Inventors: Koji Sasaki, Ibaraki-ken (JP); Naoto Saito, Ibaraki-ken (JP); Hideo Miura, Koshigaya (JP); Hiroyuki Ohta, Tsuchiura (JP); Kunio Matsumoto, Koshigaya (JP); Ryozo Yoshino, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/391,089

(22) Filed: Sep. 16, 1999

(30) Foreign Application Priority Data

Sep. 18, 1998 (JP) ............................................. 10-264307

(51) Int. Cl.$^7$ .............................................. G06K 19/06
(52) U.S. Cl. ...................... 235/492; 235/441; 235/487; 235/435; 235/380
(58) Field of Search ................................ 235/492, 380, 235/441, 435, 487, 438, 488

(56) References Cited

U.S. PATENT DOCUMENTS

| | | | | |
|---|---|---|---|---|
| 3,888,708 A | * | 6/1975 | Wise et al. ..................... 438/53 |
| 3,984,620 A | * | 10/1976 | Robillard et al. ........... 174/52.4 |
| 4,719,140 A | * | 1/1988 | Hara et al. .................... 235/492 |
| 4,727,246 A | * | 2/1988 | Hara et al. .................... 235/488 |
| 4,731,645 A | * | 3/1988 | Parmentier et al. ......... 235/380 |
| 4,754,319 A | * | 6/1988 | Saito et al. ...................... 357/72 |
| 4,792,843 A | * | 12/1988 | Haghiri-Tehrani et al. .. 235/492 |
| 4,825,283 A | * | 4/1989 | Shino .......................... 361/392 |
| 4,845,351 A | * | 7/1989 | Hara et al. .................... 235/492 |
| 4,897,534 A | * | 1/1990 | Haghiri-Tehrani ............ 235/488 |
| 5,480,842 A | * | 1/1996 | Clifton et al. ................ 437/226 |
| 5,481,102 A | * | 1/1996 | Hazelrigg, Jr. ............... 235/487 |
| 5,689,136 A | * | 11/1997 | Usami et al. ................ 235/492 |
| 5,786,988 A | * | 7/1998 | Harari ......................... 235/492 |
| 5,880,027 A | * | 3/1999 | Hajime et al. ............... 438/690 |
| 5,917,706 A | * | 6/1999 | Steffen ........................ 361/773 |
| 6,127,195 A | * | 10/2000 | Farnworth et al. .......... 324/754 |
| 6,166,911 A | * | 12/2000 | Usami et al. ................ 235/492 |
| 6,291,877 B1 | * | 9/2001 | Usami et al. ................ 257/679 |

FOREIGN PATENT DOCUMENTS

| | | | | |
|---|---|---|---|---|
| EP | 1026725 A1 | * | 8/2000 | |
| EP | 0987652 | | 7/2002 | |
| JP | 61-82285 | * | 4/1986 | |
| JP | 64-11895 | | 1/1989 | |
| JP | 3222346 | * | 10/1991 | |
| JP | 6-232255 | | 8/1994 | |
| JP | 4-62921 | | 8/1997 | |
| JP | 2000112825 A | * | 4/2000 | ............ G06F/12/14 |
| JP | 2001156028 A | * | 6/2001 | ......... H01L/21/301 |

* cited by examiner

Primary Examiner—Thien M. Le
Assistant Examiner—Uyen-Chau N Le
(74) Attorney, Agent, or Firm—Mattingly, Stanger & Malur, P.C.

(57) ABSTRACT

An IC card has an IC chip and a circuit layer formed between layers of a base material that are adhered together by an adhesive. The IC card has a thickness of 0.25 to 0.76 mm and therefore the thickness of the IC chip needs to be about 0.2 mm, which requires grinding of the IC chip. In use, the IC card is subject to bending forces which apply a bending stress on the chip. In the process of grinding the IC chip, grinding flaws having sharp parts arise that reduce the bending strength of the chip. Also, during the dicing process of the wafer, chipping occurs that results in notches having sharp tip parts being formed in the chip. The grinding flaws that result from the grinding and the notches that result from the chipping are etched to remove their sharpness, which occurs at the tip part of the grinding flaw or the tip part of the notch. By rounding these sharp parts through the etching step, the bending strength of the IC chip increases and the durability of the IC card is ensured.

12 Claims, 5 Drawing Sheets

IC CARD AND ITS MANUFACTURING METHOD

BACKGROUND OF THE INVENTION

Recently, demand of an IC card is rising as an electronic approval card, a prepaid card, a periodic ticket and a card for individual certification and so on.

The IC card has the following feature.

1) The memory capacity of the IC card (500–16000 characters) is greater than the memory capacity of a conventional magnetic card (about 80 characters).
2) The IC card is harder to forge than the magnetic card.
3) By using the electromagnetic induction phenomenon by radio transmission, the nontouch type IC card can be manufactured.

Usually, a card( IC card, magnetic card) is put in a purse, a card case or carried loose; so, the IC card is required to satisfy the following same specifications compared to a magnetic card.

1) The size of the IC card is smaller than the magnetic card.
2) The thickness of the IC card is the same or thinner than the magnetic card.
3) The weight of the IC card is the same or lighter than the magnetic card.
4) The IC card is flexible against bending by external force.

The IC card has the IC chip, therefore, the IC card has a possibility of damage of the IC chip by the transformation.

The following is important in order to improve the reliability of the IC card against the transformation.

1) Structure of the IC card that resists the transformation to the IC chip.
2) Structure of the IC chip that even if the IC chip is transformed, the IC chip does not destroy.

The IC card that is hard to transform the IC chip even if the IC card is transformed is disclosed to Japanese patent Laid-open print No. 64-11895(prior art 1). Prior art 1 is disclosing the IC card structure that the IC chip suppresses the transformation by holding and reinforcing the IC chip with a metal plate.

It is important that the IC chip itself should be thin and to decrease the defect of the IC chip surface so that it is hard to destroy it by the transformation. A bending transformation of the IC chip and a stress of the IC chip surface are proportional to the thickness of the IC chip.

Generally Silicon (Si) used as a material of the IC chip is a brittle material. The IC chip is destroyed from the mirror surface defect. So, it is desirable to decrease the defect of the chip mirror surface.

A method of preventing destruction by forming the IC chip itself is disclosed to the Japanese patent Laid-open print No. 1-235699(prior art 2). Prior art 2 is disclosing the manufacturing method of removing the micro crack on the mirror surface of the IC chip by etching processing.

The Japanese patent Laid-open print No. 4-62921(prior art 3) uses plasma etching machine and is disclosing a removal of the reaction secondary product by 2 step etching.

The Japanese patent Laid-open print No. 6-232255(prior art 4) is dicing a wafer from the mirror surface of the chip to prevent the chipping that occurs in the mirror surface of the chip.

SUMMARY OF THE INVENTION

By the improvement of the manufacturing technique of the IC circuit, the thin type and the small area of the IC chip are advancing recent years. The thin type and the small area of the IC chip improve the flexibility against the transformation of the IC card. But high precision of the manufacture technique of the IC chip is also high is required. Despite the IC chip becoming thinner than the past and the removal the micro crack in the IC chip by etching before dicing wafer (prior art 2), the strength improvement of the chip is insufficient. The method of dicing of the wafer from the mirror surface of the chip (like prior art 4) cannot suppress the chipping that occurs in the device surface of the chip. Therefore, the IC chip strength is not improved.

The IC chip after dicing is thin, and the area is small. Therefore, it is difficult to etch only the mirror surface of the IC chip selectively by plasma etching, etc. from the problem of productivity and the transfer. When using isotropical chemical etching, etc., the device surface of the IC chip is eroded by etching. The purpose of the present invention is to provide an IC card which has high reliability against transformation by external force.

The inventors determined a break stress on the mirror surface and the device surface of the IC chip by 3 points bending test. The test result was analyzed by accumulative probability to destroy and break stress (FIG. 3). FIG. 3 (A) illustrates the break stress of the mirror surface of the IC chip. FIG.3 (B) illustrates the break stress of the device surface of the IC chip. As is clear from this figure, break stress on the mirror surface of the IC chip is smaller than break stress on the device surface of the IC chip and the dispersion of break stress also enlarges.

From this, it is thought that the defect much exists on the mirror surface of the IC chip. The inventors measured the break stress on the mirror surface of various IC chips for which the grinding conditions at the time of IC chip manufacturing are the same and dicing conditions are different, by the 3 points bending test. The result was arranged on FIG. 4. As it is shown in FIG. 4, dicing conditions (four conditions; Dicing A, Dicing B, Dicing C, Dicing D ) also greatly changes break stress of the IC chip. It is proved that the defect that arises from this dicing in the manufacturing process of the IC chip has given the break strength of the IC chip a large influence.

In FIG. 5, the typeof defects on the mirror surface after dicing the IC chip are shown. The circumference part of the chip is inhere many flaws occur. This is chipping caused on the mirror surface of the IC card by the process of dicing. From this, the destruction strength of the IC chip declines by the chipping that arises on the mirror surface side by dicing of the manufacturing process of the IC chip.

That is, from the inventor's analysis it is found that elimination of the chipping that exists in the circumference part on the mirror surface of the IC chip improves the destruction strength of the IC chip. The process of etching the IC chip is done after dicing to eliminate the chipping that occurs on the mirror surface of the IC chip. But the IC chip that is the present application field of the invention has a thickness 60 $\mu$m or less. The IC chip, after dicing is very thin and small so it is difficult to handle. Therefore, there is a problem in productivity and the transfer by the method of etching only the mirror surface selectively by plasma etching machine, etc.

When the IC chip is etched by chemical etching, the problem of the above productivity and the transfer does not arise. But a problem has been discovered of eroding the device surface as well as the mirror surface of the IC chip by etching because etching cannot be done selectively.

DESCRIPTION OF THE PREFERRED EMBODIMENTS

Figure 1:
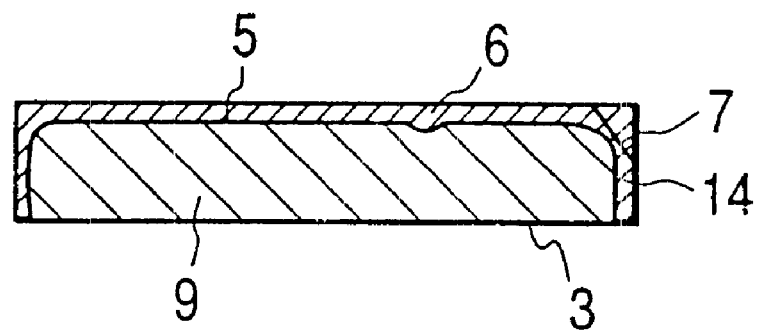
FIG. 1 is the sectional view of the IC card that is example of the present invention.
Figure 1:
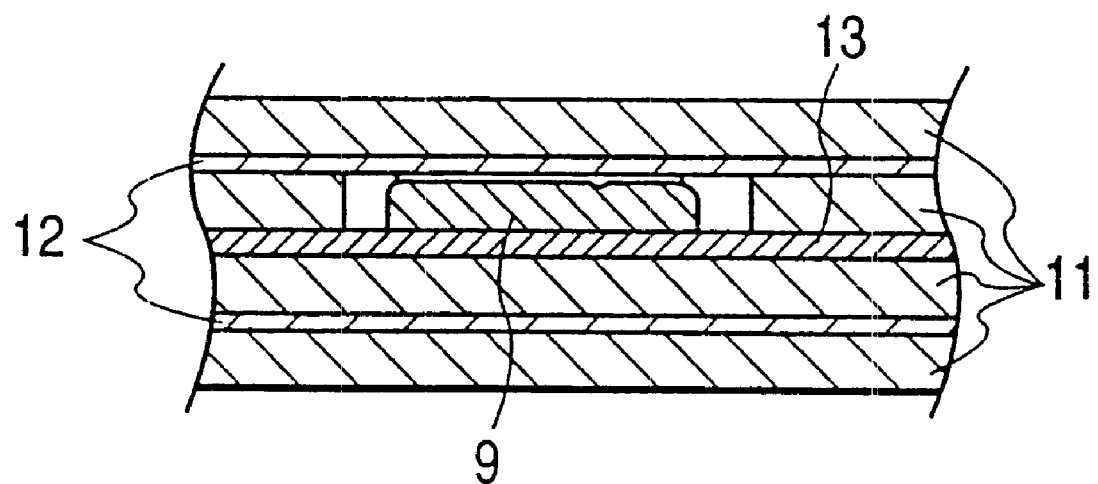

As follows, the example 1 of the present invention is referred to and is explained by using the figure. FIG. 1 is a sectional view of the IC card of this example. The thickness of the IC card of this example is an about 0.46 mm. Card base material 11 is pasted together by adhesive 12, and IC chip 9 and circuit layer 13 are included. As for IC chip 9, the mirror surface and the side are etched.

Because of excluding the sharpness part of chipping 7 that arises in the IC chip by dicing, the IC chip bending strength enlarges. The advantage that is equal to this example as for the IC card having the thickness about 0.46 mm, can be expected for the IC card of thickness 0.76 mm or less.

The manufacturing process of IC chip 9 is explained by using FIG. 2. In the manufacturing process of the IC chip, in the process (FIG. 2(a)) of supplying the protection agent after the circuit installation process, the epoxy resin is first applied to surface 3 of the device of wafer 1 before mirror surface grinding and dicing as protection agent 2. The protection agent does not need to be the epoxy resin. It has only to be a material that is not eroded in the etching process (FIG. 2(e)) that is done later. For example, heat curable resin, thermoplastic resin, etc. are fine. The purpose of applying the protection agent is that it prevents erosion of the device surface of the IC chip by the etching process (FIG. 2(e)). In this example, the protection agent is applied before mirror surface grinding and dicing and after the circuit installation. It is contemplated to apply the protection agent after mirror surface grinding. The time of the protection agent application is before dicing process, otherwise it is not limited especially.

Figure 2A:
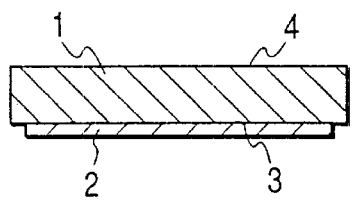
FIGS. 2(a) to (f) show part of the manufacturing process of the IC chip that is the example of the present invention.
Figure 2B:
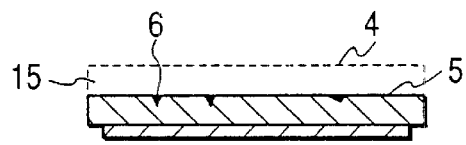

The mirror surface grinding process (FIG. 2(b)) is done from the side of old mirror surface 4 of the wafer. As for the IC card at present, the thickness is 0.76–0.25 mm. In order to store the IC chip in the IC card of this thickness, the IC chip needs grinding until the thickness becomes 0.2 mm. To the IC chip stored in the IC card, it likewise with the IC card is bent by force that is added from the outside at the time of carrying the IC card and at the time of using, and the transformation arises and a stress occurs on the surface of the IC chip.

The thickness of the IC chip is defined as T, the Young's modulus rate of the IC chip is defined as E, and radius of curvature of the IC chip is defined as R. The IC chip bending stress σ is represented with $\sigma = ET/(2R)$.

If the IC chip is thin, the bending stress of the IC chip becomes small against the bending transformation of the IC chip of the same radius of curvature. Therefore, as for the IC chip, it is desirable that it is ground to lighten as much as possible. Grinding flaw 6 arises in mirror surface 5 of wafer 1 at the time of mirror surface grinding.

In the IC chip manufactured by a conventional IC chip manufacturing method, it has possibility that it becomes the factor that grinding flaw 6 that arises at the time of mirror surface grinding makes it reduce the bending strength of the IC chip. For example, it is desirable reduce the grinding speed not to be able to do grinding flaw 6 on the mirror surface of the IC chip when the mirror surface of the IC chip is ground. But to reduce the grinding speed increases the time that is needed in the mirror surface grinding in the production process of the IC chip. According to this example, grinding flaw 6 is eliminated in the etching process (FIG. 2(e)). So, grinding flaw 6 that arises at the time of mirror surface grinding can be permitted and possible to improve productivity. For example, it is not necessary to reduce the grinding speed in the method of manufacturing the IC chip that is used for the IC card of which the thickness is 0.46 mm or more. As for the IC card of which the thickness is 0.46 mm or less, it is desirable that the conventional method of making a grinding flaw small also is done. As a result the IC chip of which the bending strength is high can be manufactured. Manufacturing of the IC card of high reliability is enabled.

Figure 2C:
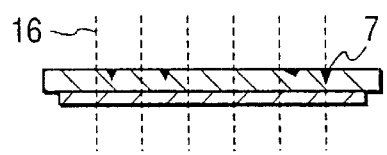
Figure 2D:
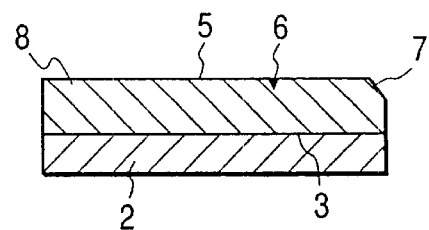
Figure 6:
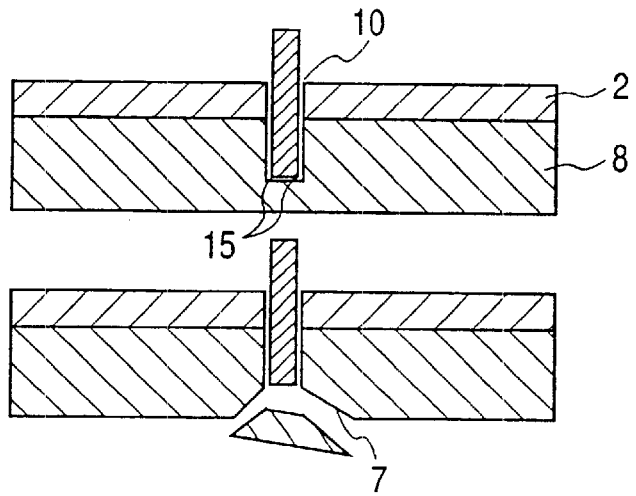
FIG. 6 represents the generation mechanism of the chipping in the manufacturing process of the IC chip as analyzed by the inventors.

Dicing process (FIG. 2(c)) of the next ground IC chip is done. Dicing uses the blade of 20 μm thickness here. The protection agent also is cut with the wafer by dicing process (FIG. 2(c)). There is a fear of the occurrence of chipping 7 in the circumference part of the IC chip by dicing process (FIG. 2(c)). Chipping generation mechanism is shown in FIG. 6. When blade 10 cuts protection agents 2 and wafer 1, the part of wafer that is not cut destroys the part from which wafer was cut as starting point 15. This destruction is called chipping. It is thought that the vibration that is given to wafer 1 by the rotation of blade 10 is the cause to this.

Figure 5:
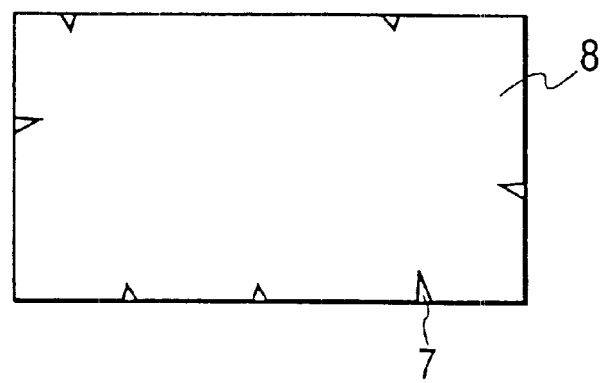
FIG. 5 represents the state of the mirror surface after dicing of the IC chip that is used for a conventional IC card as found by the inventors.

FIG. 5 shows the chipping that occurs in the IC chip by dicing. Chipping 7 comes to the circumference of the IC chip like a notch. The depth of chipping 7 is form 10 μM to more than 100 μm. It becomes the cause that chipping 7 reduces the bending strength of the IC chip. The method of slowness of the transmission speed of blade 10 in order not to generate this chipping as much as possible is thought. But this method has the fear of increasing the time that is needed in dicing process. In the method of manufacturing the IC chip in the example of the present invention, coming of the sharp notch of the chipping 7 tip part is removed in the back etching process (FIG. 2(e)). Therefore, chipping 7 that arises at the time of dicing process can be permitted, and it is possible to improve productivity. The chip after dicing consists like of FIG. 2(d). Grinding flaw 6 and chipping 7 arise in mirror surface 5 in IC chip 8 after dicing.

Figure 2E:
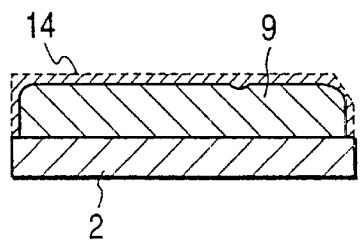
Figure 2F:
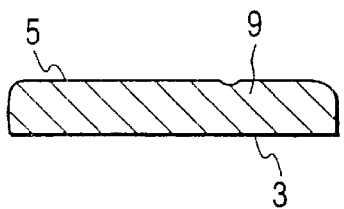
Figure 3A:
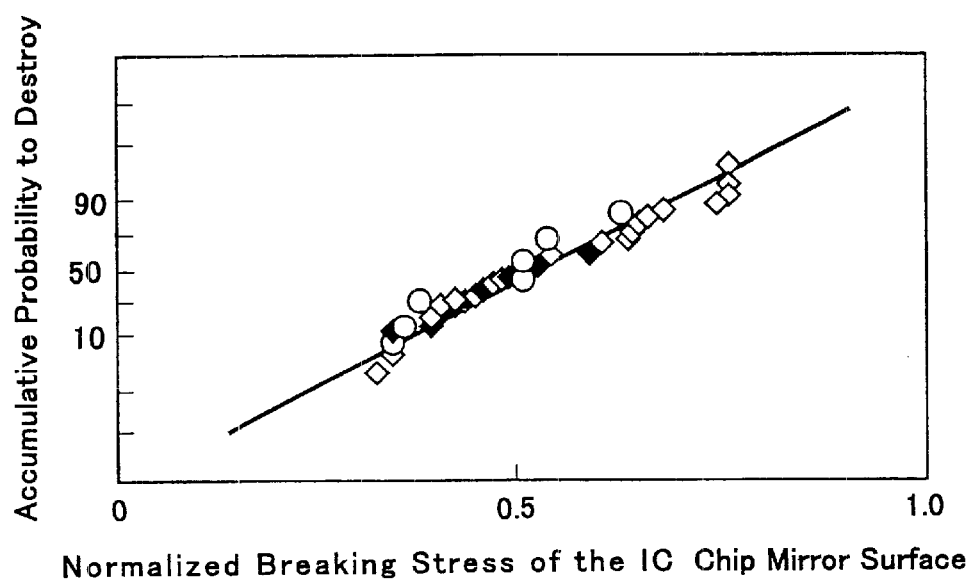
FIGS. 3(a) and (b) illustrate relationship found by the inventors between the accumulative probability to destroy and break stress of the IC chip that is used for a conventional IC card.
Figure 3B:
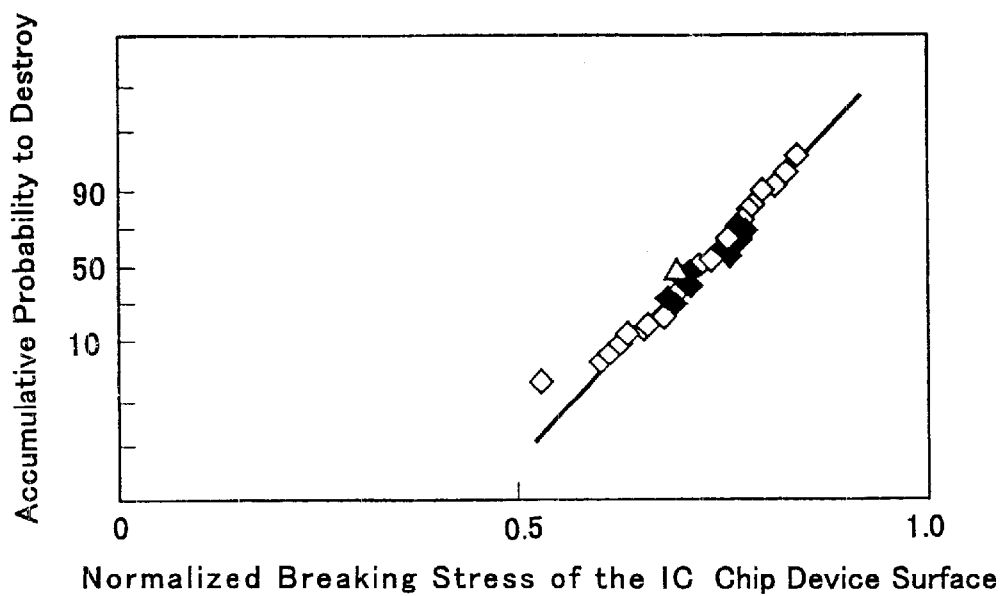
Figure 4:
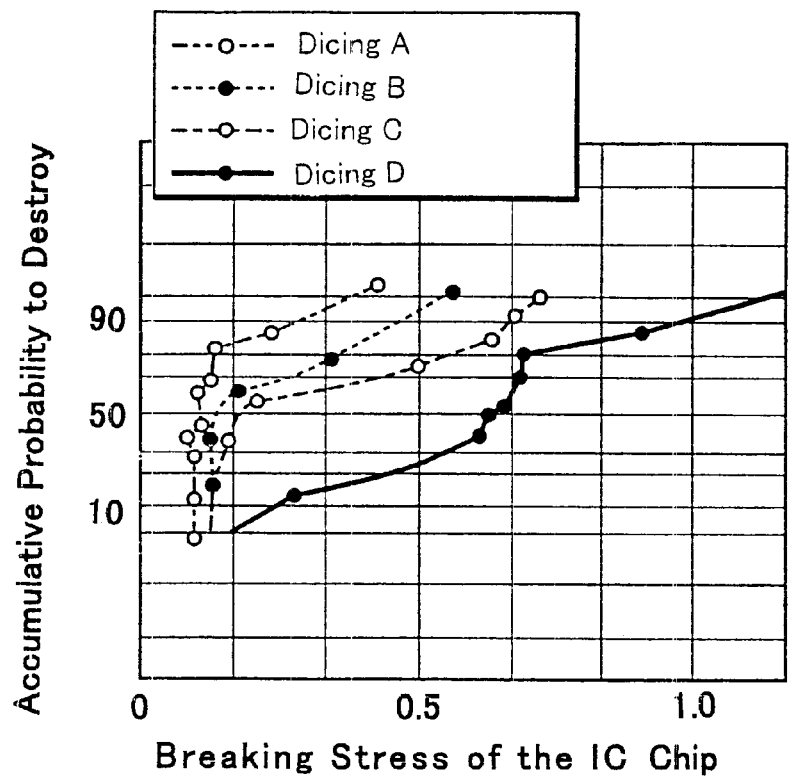
FIG. 4 illustrates a relationship found by the inventors between accumulative probability to destroy and break stress by dicing condition of the IC chip that is used for a conventional IC card.

Etching processing (FIG. 2(e)) is done. Etching processing is done by chemical etching by the mixture liquid of fluoric acid, nitric acid and acetic acid. As for IC chip 8, the surface without device surface 3 (mirror surface 5 and side ) protected by resisting is processed by this etching. The purpose of etching processing is not to remove all chipping 7 that occurs in mirror surface 5 of IC chip 8 and all grinding flaws 6. The purpose of etching processing is to remove sharp notch coming of the chipping tip part or the grinding flaw tip part that gives the declination of the bending strength of the IC chip the influence.

As for the etching quantity, the bending strength improvement of the IC chip has the Advantage sufficiently in 10 μm or less. When even if the etching quantity is greatly taken, the problem of erosion of the part does not arise other than the mirror surface of the IC chip, if the etching quantity is enlarged, the Advantage of the bending strength improvement of the chip also enlarges. After the etching process (FIG. 2(e)), the protection agent removal (FIG. 2(f)) is done.

In the process of the protection agent removal, the protection agent applied on device surface 3 of IC chip 9 is eliminated. The protection agent removal is chemically done by dipping the IC chip in the protection agent removal liquid. While acetone was used as a protection agent removal liquid in this example, the protection agent removal liquid is not limited to this, the protection agent can be removed, and device surface 5 of IC chip 8 has only not to be eroded.

Figure 7:
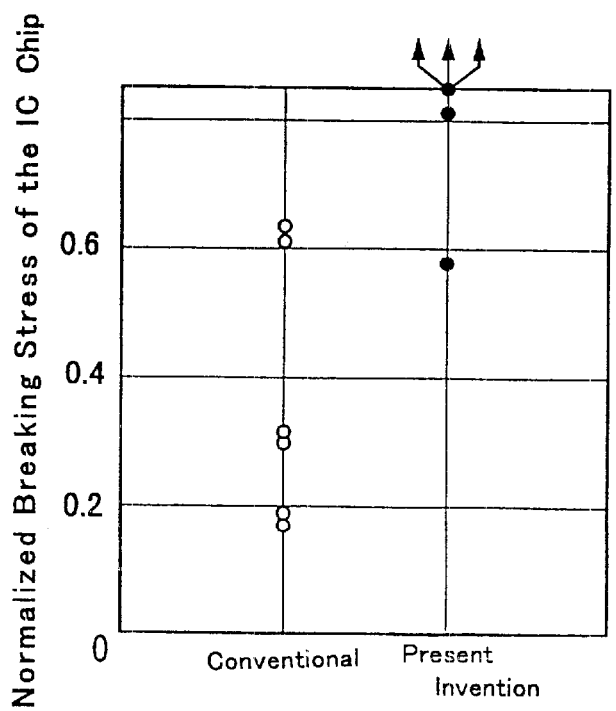
FIG. 7 is the figure that shows the difference between the breaking stresses of the IC chip of the present invention and a conventional IC chip.

FIG. 7 is the result that the bending strength of IC chip 9 of this example is measured. The bending strength of the IC chip went by the three points bending test. For the comparison, the result that the bending strength of the IC chip that does not eliminate the chipping that occurs in dicing is shown in FIG. 7. As it is shown in FIG. 7, the bending strength of the IC chip of this example becomes 2 times or more value of the bending strength of the IC chip manufactured in the conventional method. The method of manufacturing the IC chip by this example understands that it is valid for IC chip manufacturing that is hard to be destroyed.

The present invention provides an IC card and its manufacturing method of high reliability that is hard chip breakage to the IC chip.

What is claimed is:

1. An IC card, comprising:
   layers of a base material secured together with an adhesive;
   an IC chip fit between the layers of the base material, including:
      a first surface wherein a circuit is formed on the first surface;
      a second surface located on a back side of the first surface;
      a third surface located between the first and second surfaces, wherein the second surface has grinding flaws and the third surface has chipping flaws that are rounded to remove sharpness by etching said second and third surfaces.

2. An IC card according to claim 1, wherein the IC chip is made of silicon.

3. An IC card according to claim 1, wherein the one of grinding and chipping flaws that have been rounded are located at a circumferential part of the IC chip.

4. An IC card according to claim 1, wherein a thickness said IC chip is 0.2 mm or less.

5. An IC chip manufacturing process, comprising:
   forming a circuit on a first wafer surface;
   forming a protection agent over said first wafer surface;
   grinding a second wafer surface on a back side of the first wafer surface to form a thinner thickness of the wafer than that of before the grinding;
   dicing said wafer to form said IC chip, said wafer having sharp portions on the second surface due to the grinding;
   etching said IC chip on which said protection agent is formed;
   removing said protection agent from said IC chip, wherein the second wafer surface and a third surface formed by said dicing are etched to form rounded portions from sharp portions on said second surface that resulted from said grinding and from chipping flaws on said third surface that resulted from said dicing.

6. An IC chip manufacturing process according to claim 5, wherein said grinding of said second surface is performed after forming said protection agent over said first wafer surface, and then said IC chip is subject to said etching step after said dicing step.

7. An IC chip manufacturing process according to claim 5, wherein said protection agent is formed after said grinding of said second wafer surface and said etching is performed after said dicing.

8. An IC card manufacturing process, comprising:
   forming a circuit on a first wafer surface;
   forming a protection agent on said first wafer surface;
   grinding a second wafer surface on a back side of the first wafer surface to form a thinner thickness of the wafer than that of before the grinding;
   dicing said wafer to form said IC chip, said wafer having sharp portions on the second surface due to the grinding
   etching said IC chip on which said protection agent is formed; and
   removing said protection agent from said IC chip, wherein the second surface and a third surface formed by said dicing are etched to form rounded portions from sharp portions on said second surface that result from said grinding and from chipping flaws on said third surface that resulted from said dicing;
   fitting said IC chip between base layers of said card and securing said layers together with an adhesive.

9. An IC card manufacturing process according to claim 8, wherein said grinding of said second surface is performed after forming said protection agent over said first wafer surface, and then said IC chip is subject to etching after said dicing step.

10. An IC chip manufacturing process according to claim 8, wherein said protection agent is formed after said grinding of said second wafer surface and said etching is performed after said dicing step.

11. A method of manufacturing an IC card according to claim 8, wherein said etching includes wet chemical etching with a liquid mixture.

12. A method of manufacturing an IC card according to claim 8, wherein said etching includes etching with a liquid mixture comprising fluoride acid, nitric acid and acetic acid.

* * * * *